United States Patent
Park et al.

(10) Patent No.: US 11,982,291 B2
(45) Date of Patent: May 14, 2024

(54) BLOWER UNIT FOR VEHICLE, AND AIR CONDITIONING DEVICE COMPRISING SAME

(71) Applicant: Hanon Systems, Daejeon (KR)

(72) Inventors: Dae Keun Park, Daejeon (KR); Dong Gyun Kim, Daejeon (KR); Si Hyung Kim, Daejeon (KR); Eun Suk Bae, Daejeon (KR); Jun Ho Seo, Daejeon (KR); Nam Jun Lee, Daejeon (KR); Ho Lee, Daejeon (KR); Seung Woo Jo, Daejeon (KR)

(73) Assignee: Hanon Systems, Daejeon (KR)

( * ) Notice: Subject to any disclaimer, the term of this patent is extended or adjusted under 35 U.S.C. 154(b) by 210 days.

(21) Appl. No.: 17/632,424

(22) PCT Filed: Aug. 27, 2020

(86) PCT No.: PCT/KR2020/011474
§ 371 (c)(1),
(2) Date: Feb. 2, 2022

(87) PCT Pub. No.: WO2021/049792
PCT Pub. Date: Mar. 18, 2021

(65) Prior Publication Data
US 2022/0275810 A1 Sep. 1, 2022

(30) Foreign Application Priority Data

Sep. 11, 2019 (KR) .......................... 10-2019-0112824

(51) Int. Cl.
*F04D 29/42* (2006.01)
*B60H 1/00* (2006.01)
*F04D 29/44* (2006.01)

(52) U.S. Cl.
CPC ..... *F04D 29/4226* (2013.01); *B60H 1/00471* (2013.01); *F04D 29/441* (2013.01)

(58) Field of Classification Search
CPC .... F04D 29/42; F04D 29/4226; F04D 29/441; F04D 29/44; F04D 29/422; B60H 1/00471
See application file for complete search history.

(56) References Cited

U.S. PATENT DOCUMENTS

| | | | |
|---|---|---|---|
| 2012/0211205 A1* | 8/2012 | Eguchi | F04D 29/281 415/204 |
| 2012/0214394 A1* | 8/2012 | Kanemaru | B60H 1/00678 454/139 |
| 2019/0030986 A1 | 1/2019 | Fujimoto et al. | |

FOREIGN PATENT DOCUMENTS

| | | |
|---|---|---|
| JP | 2009-041517 A | 2/2009 |
| JP | 2018-167638 A | 11/2018 |

(Continued)

OTHER PUBLICATIONS

Hakata et al., "Blower Device for Vehicle Air Conditioning", Sep. 1, 2018, JPO, JP 2018167638-A (Year: 2018).*

(Continued)

*Primary Examiner* — Woody A Lee, Jr.
*Assistant Examiner* — Joshua R Beebe
(74) *Attorney, Agent, or Firm* — Norton Rose Fulbright US LLP; James R. Crawford

(57) ABSTRACT

A blower unit for a vehicle and an air conditioning device including the same, the blower unit including: a scroll casing having an inlet port; a fan rotatably disposed in the scroll casing; a motor having a shaft coupled to the fan; and a bell mouth disposed in the inlet port, in which an inner end of the scroll casing, which defines the inlet port, is disposed to be spaced apart from the fan in a radial direction to define a separation space, and the bell mouth prevents air, which (Continued)

flows by a rotation of the fan, from flowing reversely through the separation space. The blower unit and the air conditioning device including the same prevent air from flowing reversely to the outside of the scroll casing by means of the arrangement of the bell mouth and the scroll casing and the structural shape of the bell mouth.

5 Claims, 12 Drawing Sheets

(56) References Cited

FOREIGN PATENT DOCUMENTS

| KR | 10-2004-0099907 A | 12/2004 |
|----|-------------------|---------|
| KR | 10-2008-0027512 A | 3/2008  |

OTHER PUBLICATIONS

Hwangdongwoo et al. "Title Not Available" Dec. 2, 2004, Korean Patent Office, KR 20040099907-A (Year: 2004).*
Eguchi et al. "Centrifugal Blower and Air Conditioning Device for Vehicle", Feb. 26, 2009, JPO, JP 2009041517-A (Year: 2009).*
Tanaka et al. "Blowing Device for Vehicle Air Conditioning" Oct. 3, 2019, WIPO, WO 2019188366-A1 (Year: 2019).*

* cited by examiner

BLOWER UNIT FOR VEHICLE, AND AIR CONDITIONING DEVICE COMPRISING SAME

CROSS REFERENCE TO RELATED APPLICATIONS

This application is a national phase under 35 U.S.C. § 371 of International Application No. PCT/KR2020/011474 filed on Aug. 27, 2020, which claims the benefit of priority from Korean Patent Application No. 10-2019-0112824 filed on Sep. 11, 2019. The entire contents of these applications are incorporated herein by reference in their entirety.

TECHNICAL FIELD

An embodiment relates to a blower unit for a vehicle and an air conditioning device including the same. In particular, an embodiment relates to a blower unit for a vehicle capable of improving drainage performance while improving air conditioning performance by preventing a reverse flow of air, and an air conditioning device including the same.

BACKGROUND ART

A vehicle is equipped with an air conditioning device (heating, ventilating & air conditioning system (HVAC)) used to adjust an air temperature in an interior and ventilate the interior. The air conditioning device produces warm air to keep the interior of the vehicle warm or produce cold air to keep the interior of the vehicle cool.

Such an air conditioning device for a vehicle has been developed to have a small size and effectively adjust a temperature and a flow rate of air under a condition in which a sufficient space is difficult to ensure in an engine room of the vehicle.

Therefore, the air conditioning device may include a blower unit configured to blow air into an air conditioning casing, and an air conditioning unit configured to cooling or heating the air delivered by the blower unit. It is possible to reduce a size of the air conditioning device and improve the performance of the air conditioning device by improving the blower unit.

The blower unit may include a scroll casing, a fan disposed in the scroll casing, a motor configured to rotate the fan, and bell mouths configured to guide the air to the fan. In this case, the scroll casing may guide the air from the blower unit to the air conditioning unit. Further, the scroll casing may have inlet ports formed to introduce the air.

The bell mouth disposed in the upper inlet port of the scroll casing may be integrated with the scroll casing or a housing. However, because the fan is inserted into the scroll casing from below the scroll casing, the bell mouth disposed in the lower inlet port may be formed as a separate member. Therefore, the bell mouth disposed at a lower side of the scroll casing may be separately assembled to the scroll casing.

In this case, the bell mouth may be formed as a separate member and separately assembled after the fan is inserted into the scroll casing. In this case, because an outer diameter of the bell mouth is smaller than an outer diameter of the fan because of the nature of the assembly process, there is a problem in that functional performance of the bell mouth deteriorates.

Meanwhile, because the fan is rotatably inserted and disposed in the scroll casing, a gap may be formed between the scroll casing and the fan because of the structural nature.

For this reason, there may occur a problem in that the air in the scroll casing flows reversely to the outside of the scroll casing through the gap and the inlet port when the fan rotates.

In addition, there is a problem in that the fan is frozen when moisture is introduced into the scroll casing in the winter season.

DISCLOSURE

Technical Problem

An embodiment provides a blower unit for a vehicle capable of preventing air from flowing reversely to the outside of a scroll casing by means of arrangement of a bell mouth and the scroll casing and a shape of the bell mouth for guiding the air, and an air conditioning device including the same.

Another embodiment provides a blower unit for a vehicle capable of improving drainage performance by forming a drain structure on a bell mouth for discharging moisture, and an air conditioning device including the same.

Still another embodiment provides a blower unit for a vehicle capable of forming two layers of airflow to improve air conditioning performance using outside air and inside air, and an air conditioning device including the same.

Yet another embodiment provides a blower unit for a vehicle capable of improving vibration resistance using a bell mouth having one side fixed to a drive unit for operating a fan and the other side disposed to be supported on and in contact with a scroll casing, and an air conditioning device including the same.

Objectives that should be solved according to embodiments are not limited to the above described objectives, and other objectives which are not described above will be clearly understood by those skilled in the art from the following specification.

Technical Solution

The above-mentioned technical problems are solved by a blower unit for a vehicle, the blower unit including: a scroll casing having an inlet port; a fan rotatably disposed in the scroll casing; a motor having a shaft coupled to the fan; and a bell mouth disposed in the inlet port, in which an inner end of the scroll casing, which defines the inlet port, is disposed to be spaced apart from the fan in a radial direction to define a separation space, and in which an outer end of the bell mouth is disposed to overlap the inner end of the scroll casing in an axial direction to prevent air, which flows by a rotation of the fan, from flowing reversely to the outside of the scroll casing through the separation space.

In this case, the bell mouth may include: a band part having an annular shape; and legs protruding from a lower portion of the band part and coupled to the motor, and an outer end of the band part may be in contact with the inner end of the scroll casing.

Further, the band part may include: a body; an inner wheel portion protruding upward from an inner end of the body; and an outer wheel portion protruding upward from an outer end of the body, and an end surface of the outer wheel portion may be in contact with a lower surface of the inner end of the scroll casing.

Further, the scroll casing may further include a first protruding portion protruding upward from the inner end of the scroll casing, and the end surface of the outer wheel portion, which is in contact with the lower surface of the inner end of the scroll casing, may be disposed to overlap the first protruding portion in the axial direction.

Further, the scroll casing may further include a guide protruding downward from the inner end of the scroll casing, and the guide may support one side of the outer wheel portion.

In addition, the band part may include: a body; an inner wheel portion protruding upward from an inner end of the body; an outer wheel portion protruding upward from an outer end of the body; and a flange portion protruding from the outer wheel portion in the radial direction, and the flange portion may be in contact with a lower surface of the inner end of the scroll casing.

In this case, the outer wheel portion may be disposed to be higher than an upper surface of the inner end of the scroll casing. Further, an upper side of the outer wheel portion may be disposed to overlap a lower fan of the fan in the radial direction. In this case, based on the body of the band part, the end surface of the outer wheel portion may be disposed to be higher than an end surface of the inner wheel portion.

Further, the scroll casing may further include a second protruding portion protruding downward from the inner end of the scroll casing, and the second protruding portion may be disposed in a first groove concavely formed in the flange portion. In this case, the flange portion may further include a second groove connected to the first groove in the radial direction.

Meanwhile, the band part may include a hole that penetrates the body in the axial direction.

In addition, the fan may include: an upper fan; and a lower fan disposed below the upper fan, the scroll casing may include: an upper scroll casing; a lower scroll casing; and a separation wall disposed between the upper scroll casing and the lower scroll casing to define a first passageway and a second passageway, a flow of air formed by a rotation of the upper fan may move through the first passageway, and a flow of air formed by a rotation of the lower fan may move through the second passageway.

In addition, the fan may further include a barrier disposed between the inner wheel portion and the outer wheel portion.

The above-mentioned technical problems are solved by an air conditioning device including: a blower unit; and an air conditioning unit configured to cool or heat air delivered by the blower unit, in which the blower unit includes: a housing; a scroll casing disposed in the housing and having an inlet port; a fan rotatably disposed in the scroll casing; a motor having a shaft coupled to the fan; and a bell mouth disposed in the inlet port, in which an inner end of the scroll casing, which defines the inlet port, is disposed to be spaced apart from the fan in a radial direction to define a separation space, and in which an outer end of the bell mouth is disposed to overlap the inner end of the scroll casing in an axial direction to prevent air, which flows by a rotation of the fan, from flowing reversely to the outside of the scroll casing through the separation space.

Advantageous Effects

According to the blower unit for a vehicle and the air conditioning device including the same according to the embodiment, it is possible to prevent the air from flowing reversely to the outside of the scroll casing by means of the arrangement of the bell mouth and the scroll casing and the structural shape of the bell mouth.

In addition, according to the embodiment, the drain structure for discharging the moisture may be formed on the bell mouth, thereby preventing the bell mouth from being frozen by the moisture.

In addition, according to the embodiment, it is possible to use the outside air and the inside air by using the fan and the scroll casing provided to form the two layers of airflow at the time of adjusting the temperature of the interior of the vehicle. Therefore, the air conditioning device may improve the air conditioning performance. In this case, the inside air may mean air in the interior of the vehicle, and the outside air may mean air outside the vehicle.

In addition, the bell mouth may be supported on the scroll casing in the state in which the bell mouth is fixed by the legs to the drive unit for operating the fan, which makes it possible to improve the vibration resistance.

Useful advantages and effects of the embodiments are not limited to the above-described contents and will be more easily understood while the specific embodiments are described.

Figure 1:
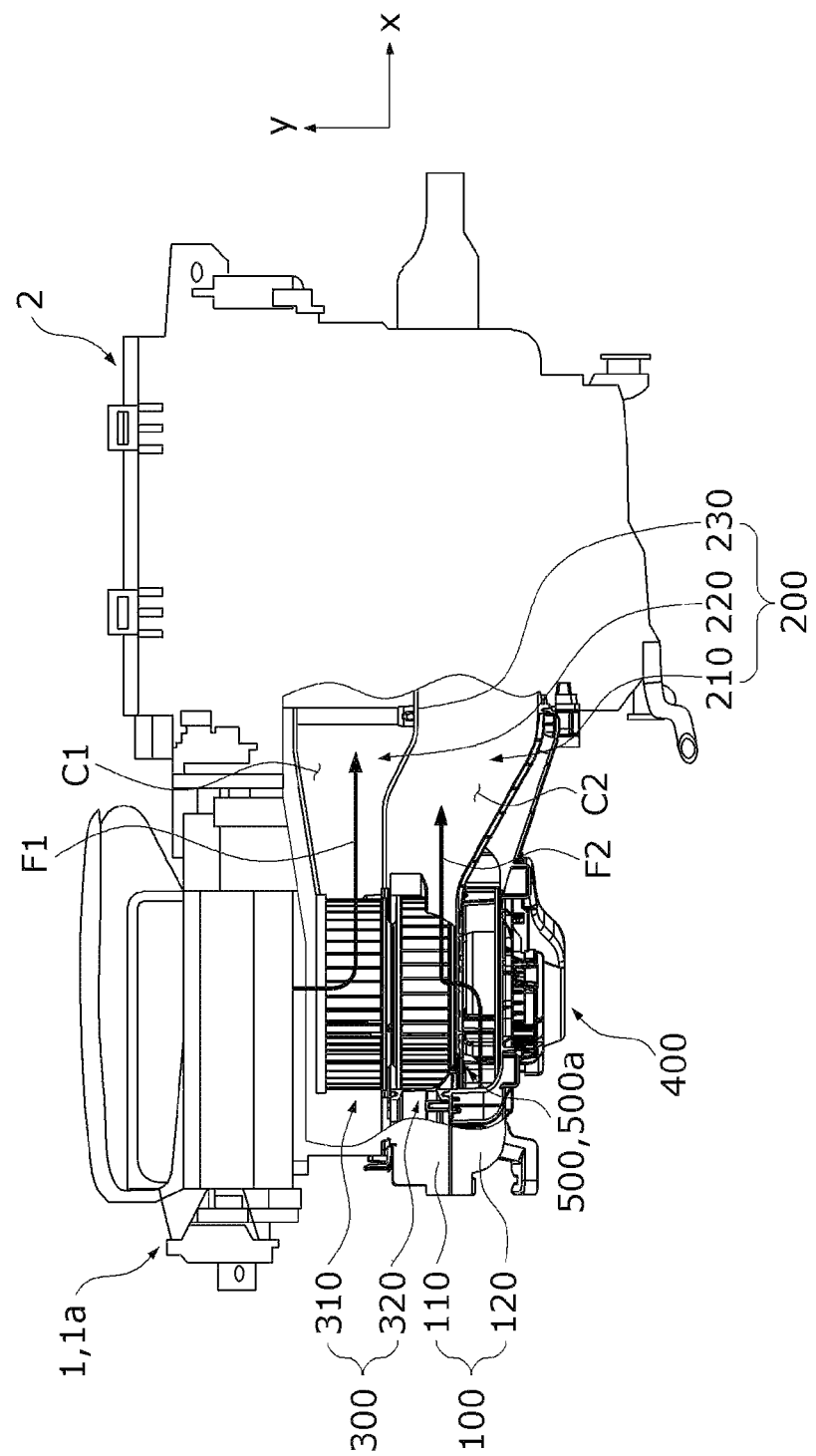
FIG. 1 is a view illustrating an air conditioning device for a vehicle according to an embodiment.

DESCRIPTION OF MAIN REFERENCE NUMERALS OF DRAWINGS 1, 1a: Blower unit for a vehicle
2: Air conditioning unit
100: Housing
200: Scroll casing
210: Upper scroll casing
220: Lower scroll casing
221: Inlet port
223: First protruding portion
224: Guide
225: Second protruding portion 300: Fan
310: Upper fan
320: Lower fan
330: Barrier
400: Drive unit
410: Shaft
420: Motor
500, 500a: Bell mouth
510, 510a: Band part

MODE FOR INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element with still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described below in detail with reference to the accompanying drawings. Components that are the same or correspond to each other will be denoted by the same reference numerals regardless of the figure numbers, and redundant descriptions will be omitted.

When air outside a vehicle (hereinafter, referred to as 'outside air') is introduced into an interior of the vehicle or when air in the interior of the vehicle (hereinafter, referred to as 'inside air') circulates, an air conditioning device for a vehicle according to an embodiment may heat or cool the interior of the vehicle by heating or cooling the outside air and the inside air.

The air conditioning device for a vehicle may include a blower unit configured to blow the inside air and the outside air into an air conditioning casing, and an air conditioning unit configured to cool or heat the air blown into the air conditioning casing by the blower unit. In this case, the air conditioning unit may adjust a temperature of the air introduced into the interior of the vehicle using a heat exchange medium such as a refrigerant and a heat exchanger configured to allow the heat exchange medium to exchange heat with the air introduced into the air conditioning casing.

FIG. 1 is a view illustrating an air conditioning device for a vehicle according to an embodiment.

Referring to FIG. 1, the air conditioning device for a vehicle according to the embodiment may include a blower unit 1 or 1a, and an air conditioning unit 2 configured to cool or heat the air delivered by the blower unit 1 or 1a. In this case, the blower unit 1 or 1a may deliver the air into the air conditioning unit 2 by forming two layers of airflow. Therefore, the air conditioning device for a vehicle may improve air conditioning performance.

First Embodiment

Figure 2:
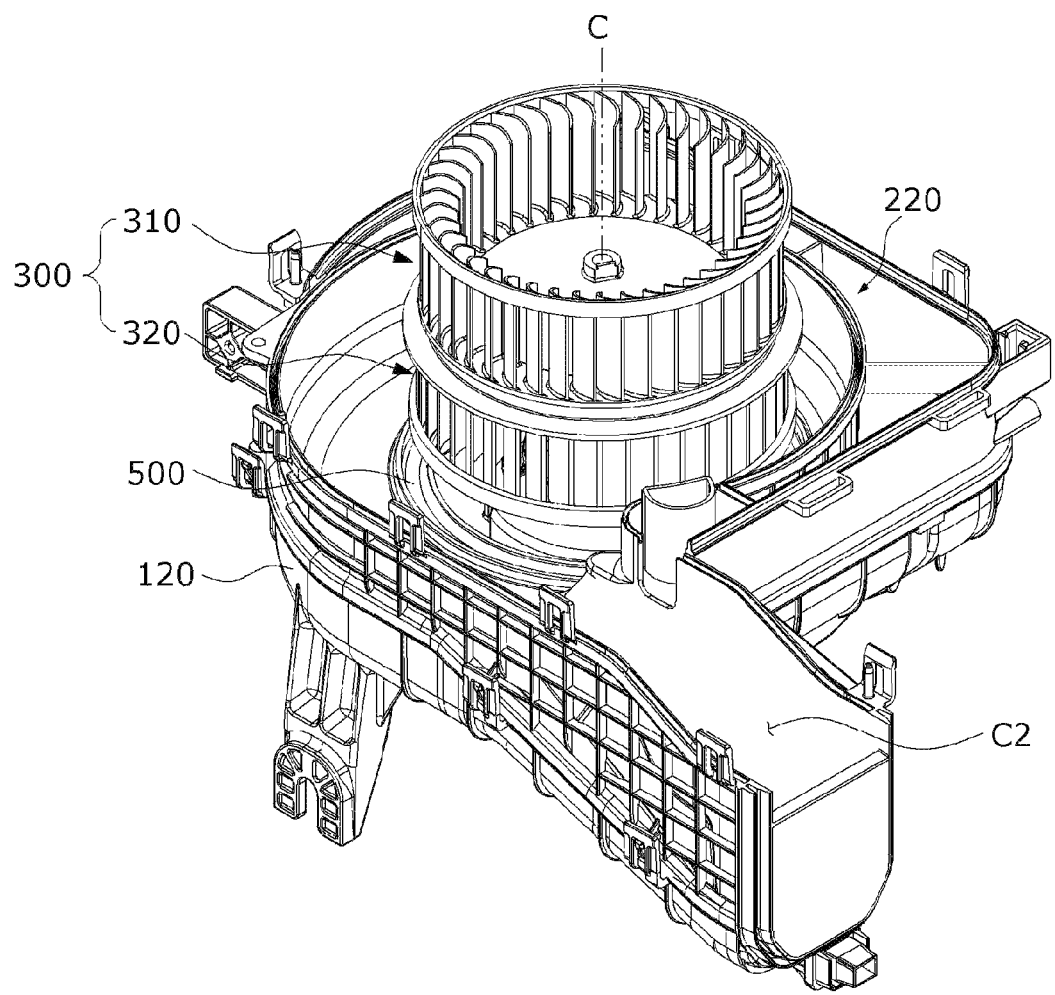
FIG. 2 is a perspective view illustrating a blower unit for a vehicle according to a first embodiment.
Figure 3:
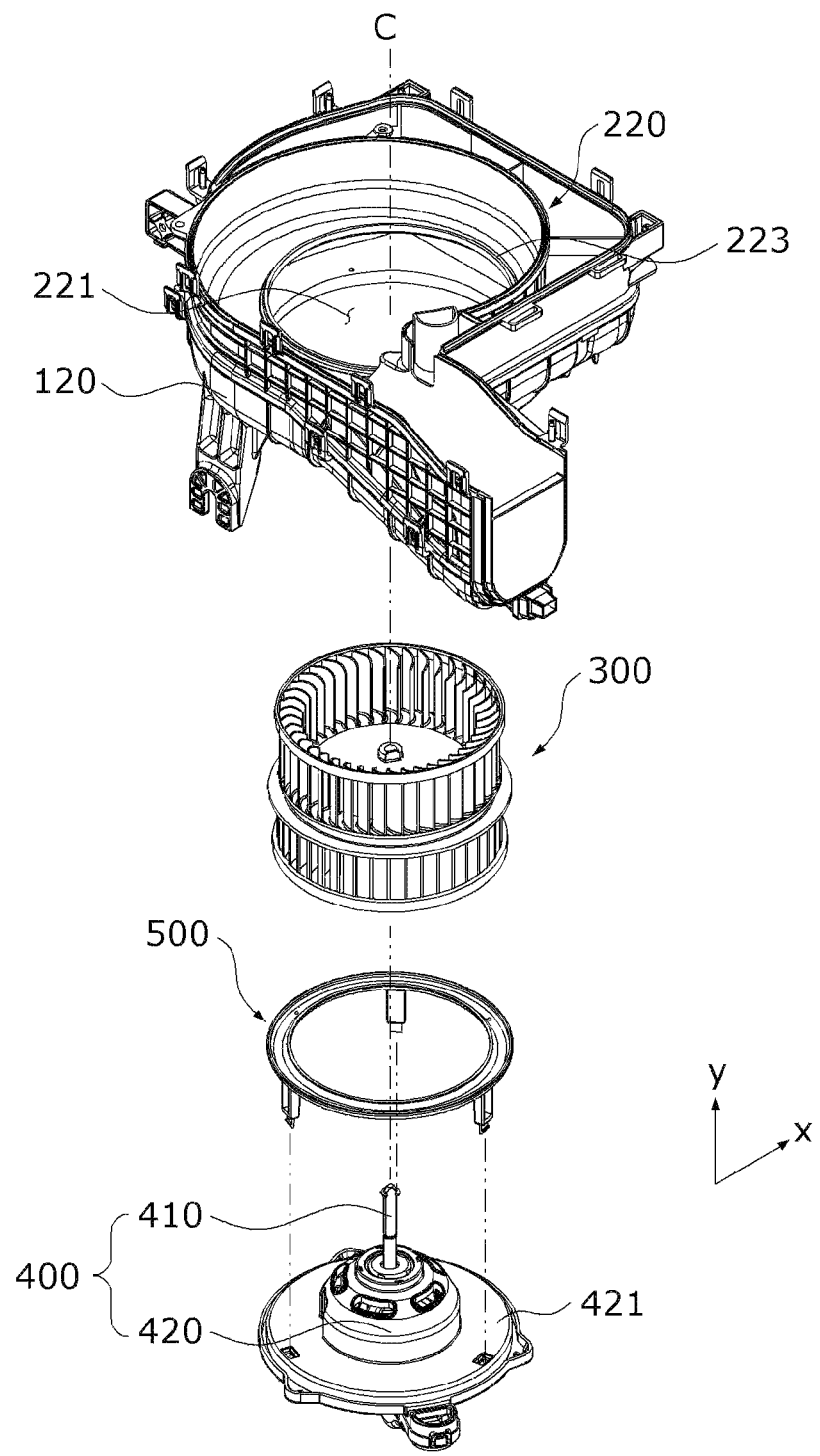
FIG. 3 is an exploded perspective view illustrating the blower unit for a vehicle according to the first embodiment.
Figure 4:
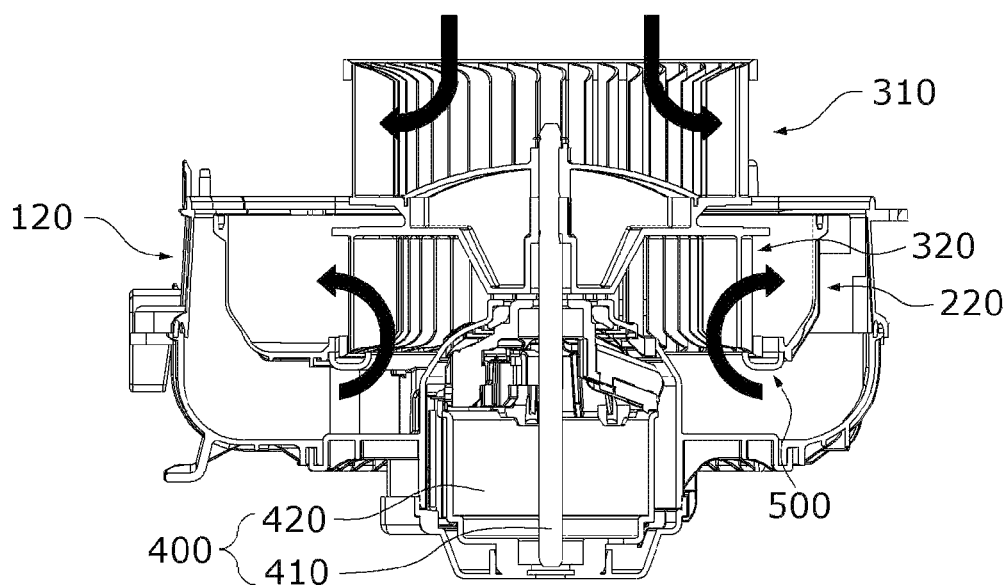
FIG. 4 is a cross-sectional view illustrating the blower unit for a vehicle according to the first embodiment.
Figure 5:
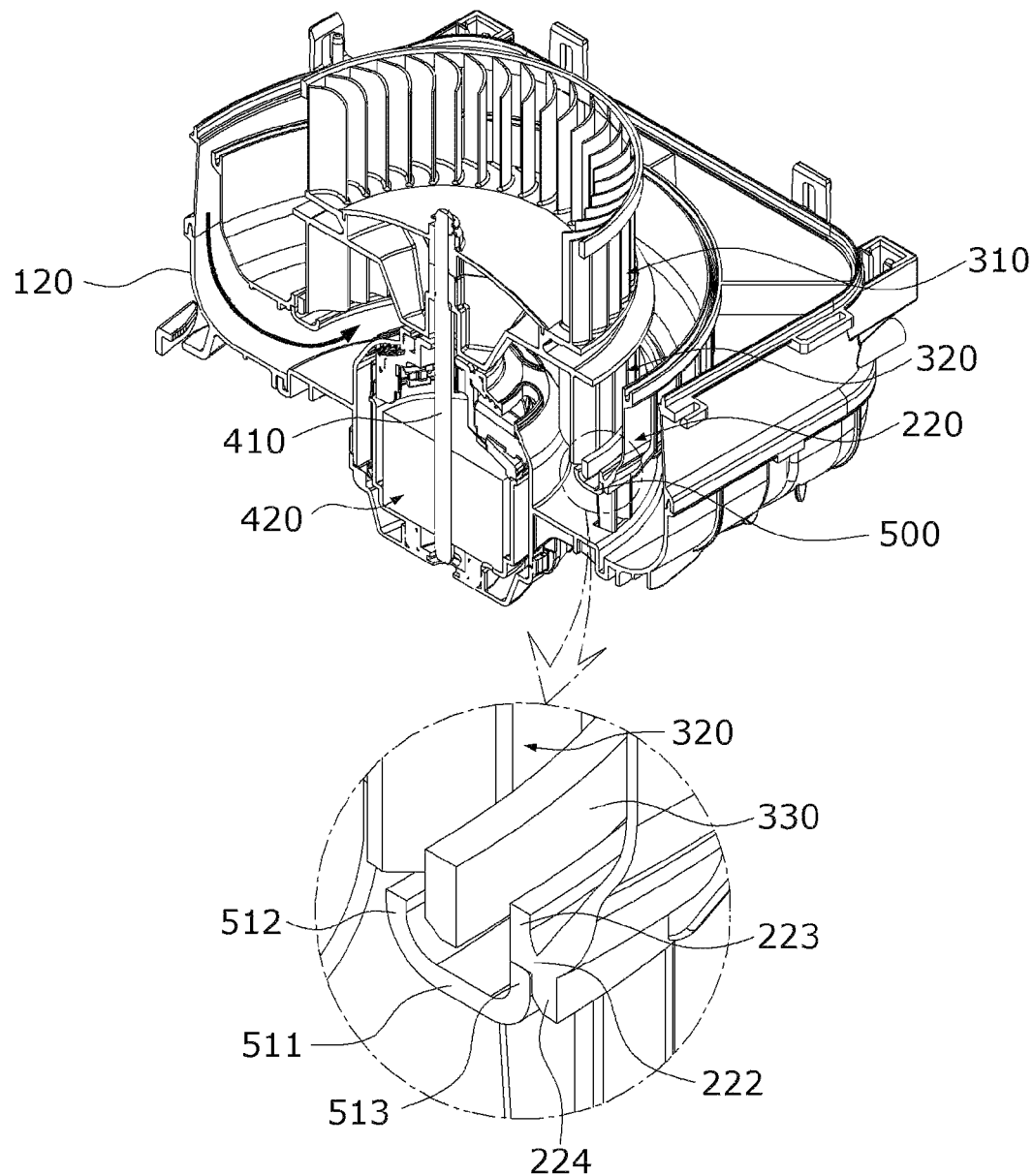
FIG. 5 is a cross-sectional perspective view illustrating the blower unit for a vehicle according to the first embodiment.
Figure 6:
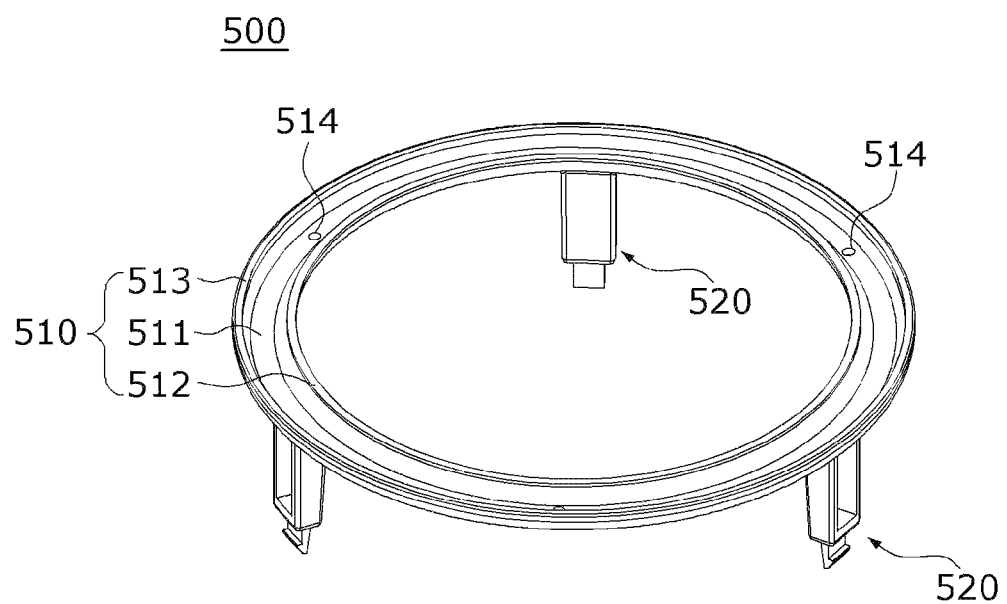
FIG. 6 is a perspective view illustrating a bell mouth disposed in the blower unit for a vehicle according to the first embodiment.
Figure 7:
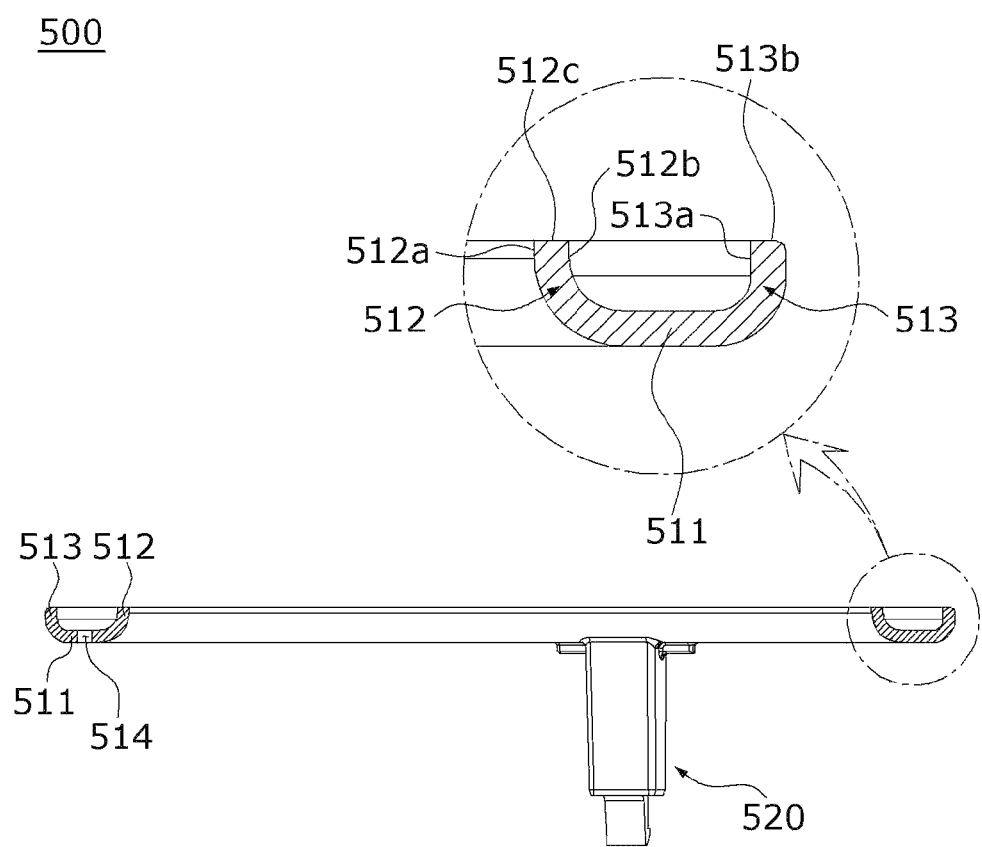
FIG. 7 is a cross-sectional view illustrating the bell mouth disposed in the blower unit for a vehicle according to the first embodiment.

FIG. 2 is a perspective view illustrating a blower unit for a vehicle according to a first embodiment, FIG. 3 is an exploded perspective view illustrating the blower unit for a vehicle according to the first embodiment, FIG. 4 is a cross-sectional view illustrating the blower unit for a vehicle according to the first embodiment, FIG. 5 is a cross-sectional perspective view illustrating the blower unit for a vehicle according to the first embodiment, FIG. 6 is a perspective view illustrating a bell mouth disposed in the blower unit for a vehicle according to the first embodiment, and FIG. 7 is a cross-sectional view illustrating the bell mouth disposed in the blower unit for a vehicle according to the first embodiment. In this case, based on a shaft disposed in the blower unit for a vehicle, an x direction may be defined as a radial direction, and a y direction may be defined as an axial direction, as illustrated in FIGS. 1 and 3. In this case, the x direction and the y direction may be perpendicular to each other.

Referring to FIGS. 1 to 7, the blower unit 1 for a vehicle according to the first embodiment may include a housing 100, a scroll casing 200 disposed in the housing 100, a fan 300 rotatably disposed in the scroll casing 200, a drive unit 400 configured to rotate the fan 300, and a bell mouth 500 disposed between the fan 300 and the drive unit 400 and configured to guide air to the fan 300.

In this case, the bell mouth 500 may be disposed in an inlet port 221 formed at a lower side of the scroll casing 200 and guide the air. In this case, the drive unit 400 may include a shaft 410 coupled to the fan 300, and a motor 420 configured to rotate the shaft 410.

The housing 100 may define an external shape of the blower unit 1 for a vehicle.

Referring to FIG. 1, the housing 100 may include upper and lower housings 110 and 120 disposed to define an accommodation space therein. Further, a hole is formed in the lower housing 120. Therefore, the blowing module including the fan 300 and the bell mouth 500 installed on the drive unit 400 may be disposed in the housing 100 through the hole. In this case, the fan 300 may be disposed in the scroll casing 200 through the inlet port 221 of the scroll casing 200.

The scroll casing 200 may be disposed in the housing 100 and guide a flow of air, formed by a rotation of the fan 300, to the air conditioning unit 2. In this case, the scroll casing 200 may include the inlet port formed to introduce the outside air or the inside air.

The scroll casing 200 may include an upper scroll casing 210, a lower scroll casing 220, and a separation wall 230 disposed between the upper scroll casing 210 and the lower scroll casing 220 to define a first passageway C1 and a second passageway C2. Therefore, the scroll casing 200 may guide the air into the air conditioning unit 2 by forming the two layers of airflow.

Further, the upper scroll casing 210 may have an inlet port provided to introduce the outside air. In addition, the lower scroll casing 220 may have the inlet port 221 provided to introduce the inside air.

Referring to FIG. 5, the lower scroll casing 220 may include a first protruding portion 223 protruding upward from an inner end 222 thereof.

The first protruding portion 223 may guide, upward, the flow of air delivered to the inner end 222. Therefore, the first protruding portion 223 may primarily block the flow of air that may be formed toward the band part 510 of the bell mouth 500, thereby preventing a reverse flow of air.

In addition, the lower scroll casing 220 may include a guide 224 protruding downward from the inner end 222. As illustrated in FIG. 5, the guide 224 may be disposed to be spaced apart outward from the first protruding portion 223 based on the radial direction.

In this case, the guide 224 may guide the arrangement of the bell mouth 500.

In addition, the guide 224 may support one side of the bell mouth 500. Therefore, the guide 224 may improve vibration resistance of the bell mouth 500.

That is, the blower unit 1 may improve vibration resistance by implementing a two-point support structure by means of legs 520 coupled to the motor 420 and the guide 224 for supporting the band part 510 of the bell mouth 500. For example, the guide 224 may improve vibration resistance against vibration generated in the radial direction, and the legs 520 may improve vibration resistance against vibration generated in the axial direction.

The fan 300 may be rotatably disposed in the scroll casing 200. Further, the fan 300 may rotate in conjunction with the rotation of the shaft 410. Further, the flow of air generated by the rotation of the fan 300 may be guided by the scroll casing 200. In this case, the fan 300 may be a sirocco fan or a radial fan.

The fan 300 may include an upper fan 310 and a lower fan 320 disposed below the upper fan 310.

The upper fan 310 may be disposed to correspond to the first passageway C1. Therefore, the flow of air generated by the rotation of the upper fan 310 may move through the first passageway C1. As illustrated in FIG. 1, the outside air may form a flow of air F1 that flows to the first passageway C1 by the rotation of the upper fan 310.

The lower fan 320 may be disposed to correspond to the second passageway C2. Therefore, the flow of air generated by the rotation of the lower fan 320 may move through the second passageway C2. As illustrated in FIG. 1, the inside air may form a flow of air F2 that flows to the second passageway C2 by the rotation of the lower fan 320.

Therefore, the blower unit 1 may form the flows of air F1 and F2 using the scroll casing 200 and the fan 300 so that the air is delivered into the air conditioning unit 2. Therefore, the air conditioning device according to the embodiment may improve the air conditioning performance by means of the flows of air F1 and F2 using the outside air and the inside air.

The drive unit 400 may rotate the fan 300. In this case, the drive unit 400 may be coupled to the housing 100.

Referring to FIG. 3, the drive unit 400 may include the shaft 410 coupled to the fan 300, and the motor 420 configured to rotate the shaft 410. In this case, the motor 420 may include a motor flange 421 formed to be coupled to the housing 100 and the bell mouth 500. In this case, the motor flange 421 may be one region of the configuration for defining the external shape of the motor 420 and called a motor body.

Referring to FIGS. 2 and 3, the scroll casing 200 may include a passageway formed at one side to guide the flow of air to the air conditioning unit 2, and a wall disposed to face the fan 300 in the radial direction of the fan 300. Therefore, the flow of air may be formed to the passageway by the rotation of the fan 300.

In this case, since the fan 300 is rotatably disposed in the scroll casing 200, the inner end 222 of the lower scroll casing 220, which defines the inlet port 221, may be disposed to be spaced apart from the lower fan 320 in the radial direction, thereby defining a separation space, i.e., a gap.

Therefore, the bell mouth 500 of the blower unit for a vehicle according to the embodiment may be disposed to close the separation space, thereby preventing the air from flowing reversely to the outside of the lower scroll casing 220. In this case, the bell mouth 500 may be disposed in the inlet port 221 and guide the inside air toward the center of the lower fan 320.

In consideration of the rotation of the fan 300, there is difficulty in disposing the bell mouth 500 so that the bell mouth 500 is in contact with the fan 300. However, the shape of the bell mouth 500 capable of guiding the flow of air may prevent the reverse flow even though the bell mouth 500 is disposed to be spaced apart from the fan 300.

Referring to FIG. 6, the bell mouth 500 may include the band part 510 having an annular shape, and the legs 520 protruding from a lower portion of the band part 510 and coupled to the motor 420.

Referring to FIGS. 4 and 5, a part of the band part 510 may be disposed below the lower fan 320. In this case, an outer end of the band part 510 may be disposed to be in contact with the inner end 222 of the lower scroll casing 220. For example, as illustrated in FIG. 4, the band part 510 may be disposed to overlap the separation space in the axial direction.

That is, the band part 510 may be disposed on the axial direction of the separation space and serve as a cover that covers a lower side of the separation space.

Therefore, the band part 510 may close the separation space to prevent the air, which flows in the scroll casing 200, from flowing reversely to the outside of the scroll casing 200 through the separation space.

However, in consideration of the arrangement relationship with the rotating fan 300, the band part 510 disposed below the lower fan 320 may be disposed to be spaced apart from the lower fan 320 in the axial direction. However, the band part 510 may have the structure for guiding the air into the scroll casing 200, thereby preventing the reverse flow.

For example, a vertical cross-section of the band part 510 may have a 'U' shape. Therefore, the band part 510 may serve to guide the flow of air upward, thereby preventing the reverse flow.

As illustrated in FIGS. 6 and 7, the band part 510 may include a body 511 having an annular shape, and an inner wheel portion 512 protruding upward from an inner end of the body 511. In this case, the inner side may mean a direction toward a central axis C of the shaft 410. Further, the outer side may mean a direction opposite to the inner side.

In addition, the band part 510 may further include an outer wheel portion 513 protruding upward from an outer end of the body 511.

In addition, the band part 510 may further include a hole 514 formed to penetrate the body 511 in the axial direction.

In this case, the body 511, the inner wheel portion 512, and the outer wheel portion 513 may be integrated.

The band part 510 may guide the flow of air upward by means of the inner and outer wheel portions 512 and 513 respectively protruding from the inner and outer sides of the body 511, thereby preventing the air from being discharged to the inlet port 221. Therefore, the band part 510 may improve air blowing performance of the blower unit 1.

Further, the band part 510 may guide the two flows of air upward by means of the inner and outer wheel portions 512 and 513 disposed to be spaced apart from each other in the radial direction, thereby more effectively preventing the reverse flow.

The inner wheel portion 512 may protrude upward from the inner end of the body 511. Therefore, an inner surface 512a of the inner wheel portion 512 may guide the inside air to the fan 300. In addition, an outer surface 512b of the inner wheel portion 512 may guide, upward, the air introduced into the body 511.

The outer wheel portion 513 may be provided at the outer end of the band part 510.

The outer wheel portion 513 may protrude upward from the outer end of the body 511. In this case, the outer wheel portion 513 may protrude and be disposed to be spaced apart from the inner wheel portion 512 in the radial direction. Therefore, the outer wheel portion 513 of the band part 510 may have the structure that guides the two flows of air upward together with the inner wheel portion 512. For example, an inner surface 513a of the outer wheel portion 513 may guide, upward, the air introduced into the body 511. Further, the air guided upward may move to the air conditioning unit 2 through the second passageway C2.

In this case, an upper surface of the outer wheel portion 513, which is an end surface 513b, may be disposed to be in contact with a lower surface of the inner end 222 of the scroll casing 200. Further, the end surface 513b of the outer wheel portion 513 may be disposed to overlap the first protruding portion 223 in the axial direction.

Therefore, since the first protruding portion 223 extends along the inner surface 513a of the outer wheel portion 513, the directionality of the flow of air guided upward by the outer wheel portion 513 may be maintained by the first protruding portion 223.

The hole 514 may penetrate the body 511 in the axial direction. Therefore, the hole 514 may implement a drain structure of the band part 510. For example, when the moisture is collected in the band part 510, the moisture may be discharged through the hole 514. Therefore, the hole 514 may improve the drainage performance.

The legs 520 may be coupled to the motor flange 421, thereby improving vibration resistance. In this case, the leg 520 may be provided in plural, and the plurality of legs 520 may be spaced apart from one another in a circumferential direction.

As described above, the bell mouth 500 disposed in the lower scroll casing 220 may also be disposed in the inlet port formed in the upper scroll casing 210. However, the bell mouth disposed in the upper scroll casing 210 may be coupled to the housing 100 without being coupled to the motor 420, but the present disclosure is not necessarily limited thereto. For example, the bell mouth disposed in the upper scroll casing 210 may be integrated with the housing 100.

Meanwhile, the fan 300 of the blower unit 1 may further include a barrier 330.

The barrier 330 may more effectively prevent the reverse flow together with the inner and outer wheel portions 512 and 513 of the band part 510.

Referring to FIG. 5, the barrier 330 may be formed in a circumferential direction of the lower fan 320. Further, the barrier 330 may be disposed between the inner wheel portion 512 and the outer wheel portion 513 in the radial direction.

In this case, a part of the barrier 330 may be disposed to overlap the inner wheel portion 512 in the radial direction.

Referring to FIG. 5, an upper surface of the inner wheel portion 512, which is an end surface 512c, may be disposed to be higher than a lower surface 331 of the barrier 330. Therefore, the barrier 330, together with the inner wheel portion 512, may more effectively prevent the reverse flow.

Second Embodiment

Figure 8:
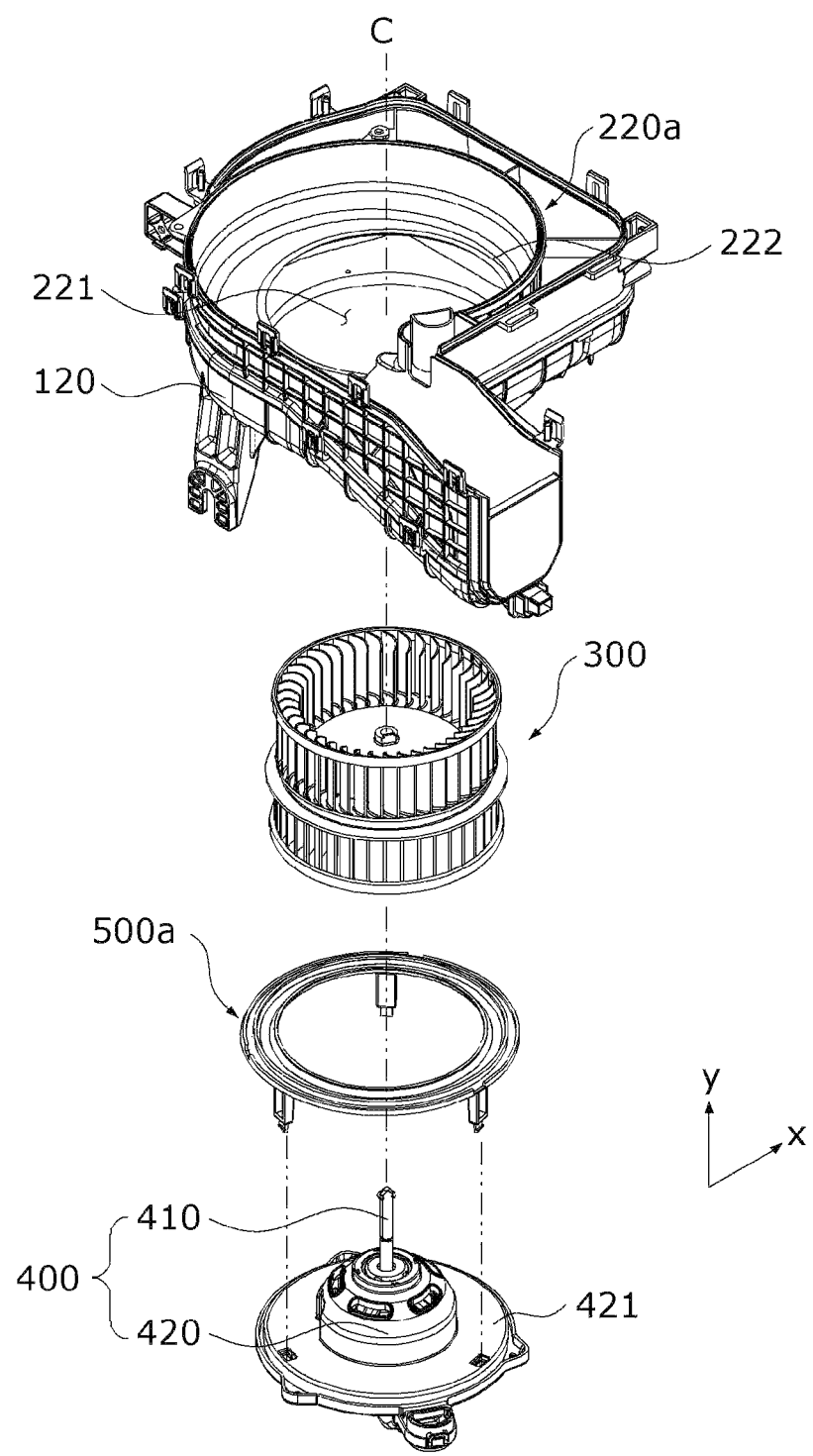
FIG. 8 is an exploded perspective view illustrating a blower unit for a vehicle according to a second embodiment.
Figure 9:
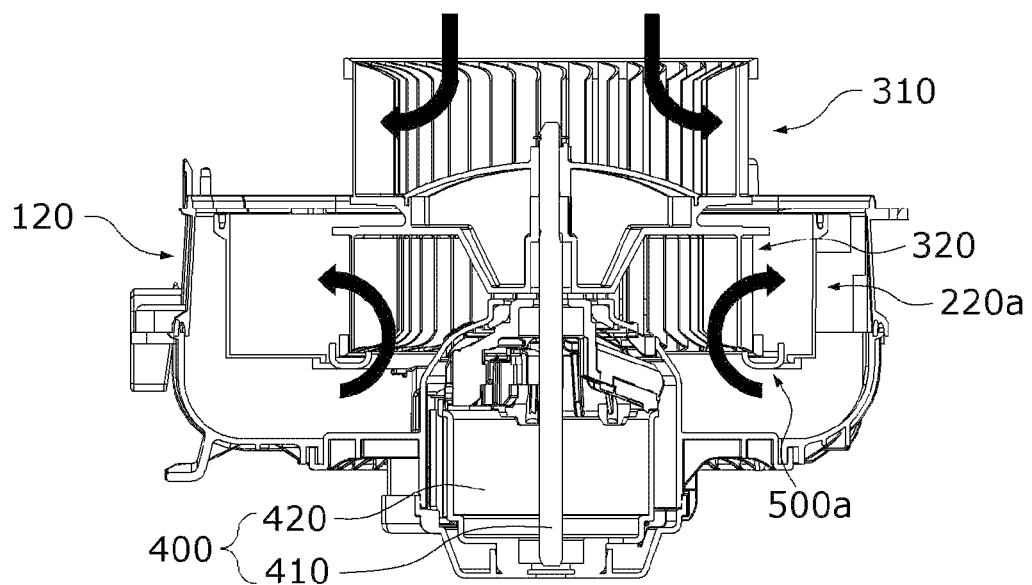
FIG. 9 is a cross-sectional view illustrating the blower unit for a vehicle according to the second embodiment.
Figure 10:
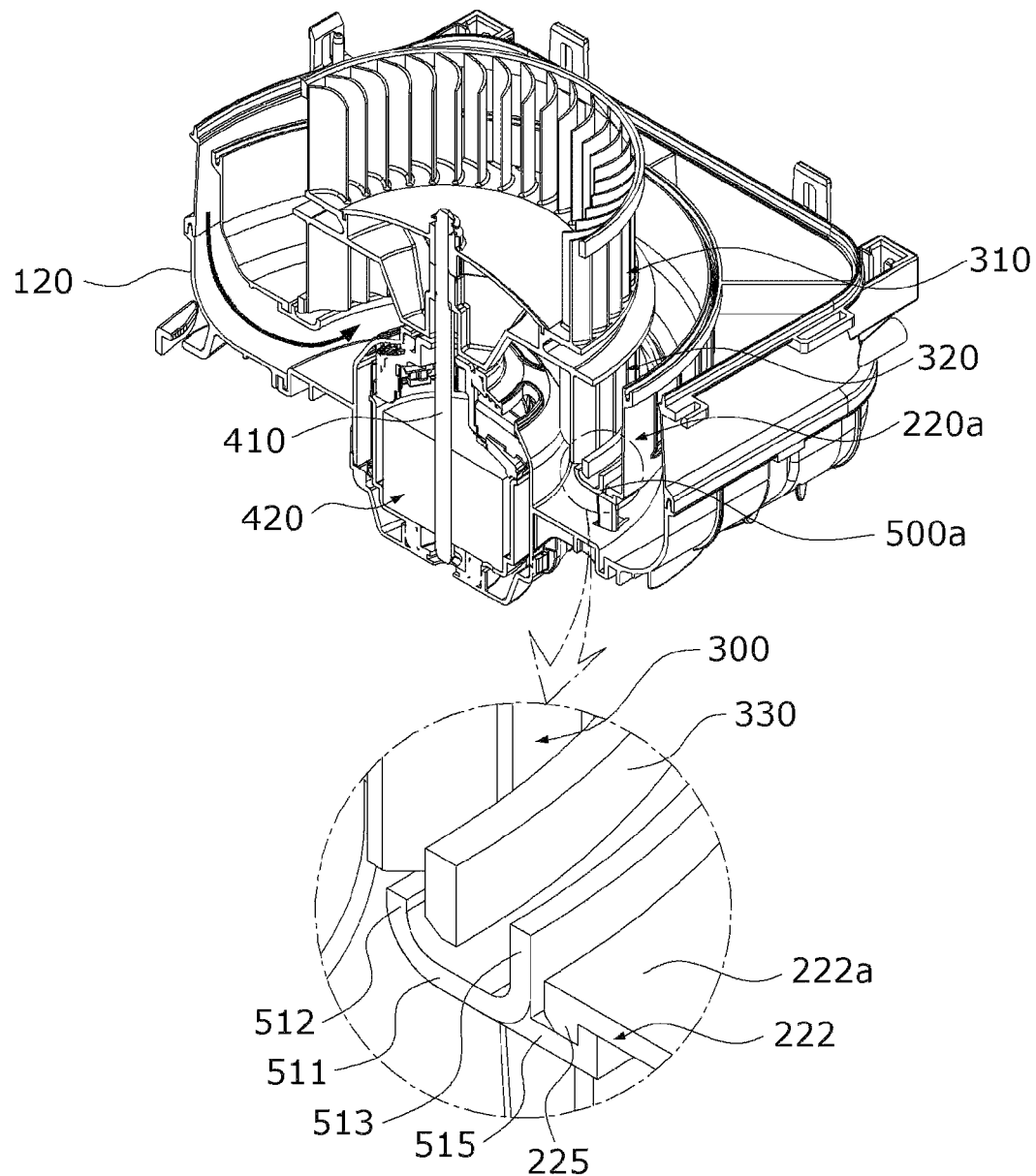
FIG. 10 is a cross-sectional perspective view illustrating the blower unit for a vehicle according to the second embodiment.
Figure 11:
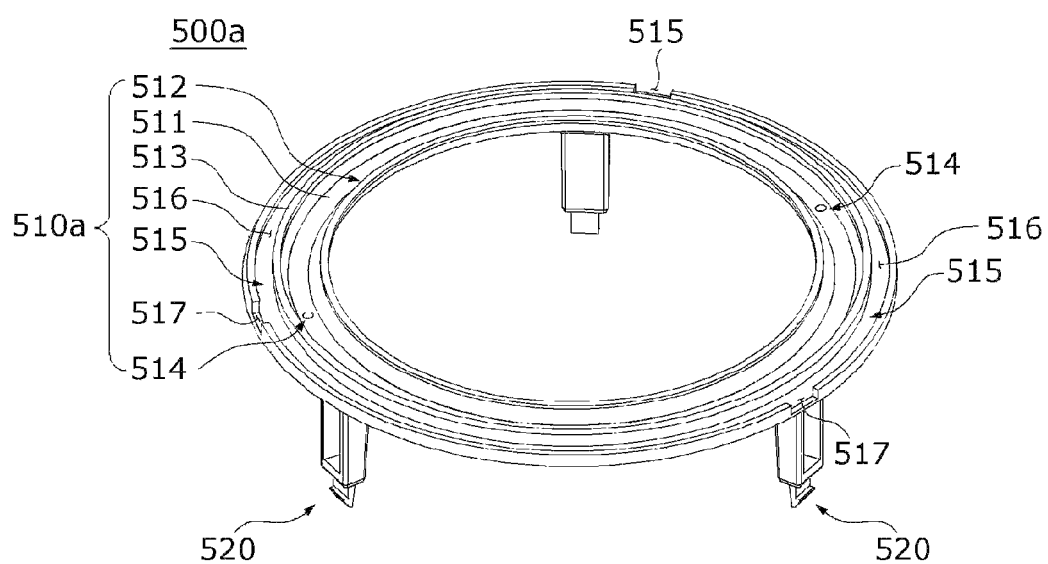
FIG. 11 is a perspective view illustrating a bell mouth disposed in the blower unit for a vehicle according to the second embodiment.
Figure 12:
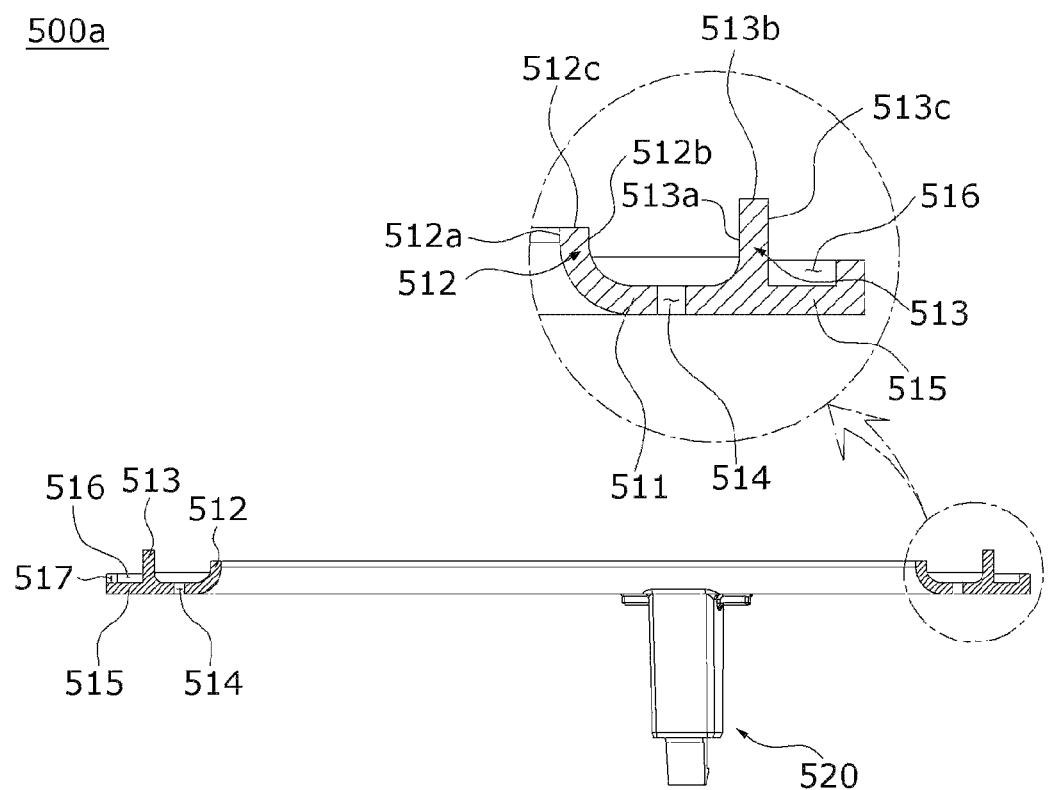
FIG. 12 is a cross-sectional view illustrating the bell mouth disposed in the blower unit for a vehicle according to the second embodiment.

FIG. 8 is an exploded perspective view illustrating a blower unit for a vehicle according to a second embodiment, FIG. 9 is a cross-sectional view illustrating the blower unit for a vehicle according to the second embodiment, FIG. 10 is a cross-sectional perspective view illustrating the blower unit for a vehicle according to the second embodiment, FIG. 11 is a perspective view illustrating a bell mouth disposed in the blower unit for a vehicle according to the second embodiment, and FIG. 12 is a cross-sectional view illustrating the bell mouth disposed in the blower unit for a vehicle according to the second embodiment.

In comparison between the blower unit 1 for a vehicle according to the first embodiment and a blower unit 1a for a vehicle according to a second embodiment to be described with reference to FIGS. 1 and 8 to 12, the blower unit 1a for a vehicle according to the second embodiment differs from the blower unit 1 for a vehicle according to the first embodiment in terms of shapes of and arrangement relationships between a lower scroll casing 220a and a bell mouth 500a.

In particular, the blower unit 1a for a vehicle according to the second embodiment differs from the blower unit 1 for a vehicle according to the first embodiment in that the blower unit 1a for a vehicle according to the second embodiment includes the outer wheel portion 513, which is formed to be higher than the inner end 222 of the lower scroll casing 220a, instead of the first protruding portion 223 of the blower unit 1 for a vehicle according to the first embodiment.

In this case, because the bell mouth 500a may be assembled as a separate member, the length and position of the outer wheel portion 513 may be easily changed in design depending on types of vehicles. Therefore, the bell mouth 500a, which is made by adjusting only the shape of the outer wheel portion 513 depending on types of vehicles, may be easily applied to the blower unit 1a for a vehicle.

Hereinafter, in the description of the blower unit 1a for a vehicle according to the second embodiment, the constituent elements identical to the constituent elements of the blower unit 1 for a vehicle according to the first embodiment will be assigned with the same reference numerals, and the specific description thereof will be omitted.

Referring to FIGS. 1 and 8 to 12, the blower unit 1a for a vehicle according to the second embodiment may include the housing 100, a scroll casing 200a disposed in the housing 100, the fan 300 rotatably disposed in the scroll casing 200a, the drive unit 400 configured to rotate the fan 300, and the bell mouth 500a disposed between the fan 300 and the drive unit 400 and configured to guide the air. In this case, the bell mouth 500a may be disposed in an inlet port 221 formed at a lower side of the scroll casing 200a and guide the air.

The scroll casing 200a may be disposed in the housing 100 and guide a flow of air formed by a rotation of the fan 300. In this case, the scroll casing 200a may include the inlet port formed to introduce the outside air or the inside air.

The scroll casing 200a may include an upper scroll casing 210, a lower scroll casing 220a, and a separation wall 230 disposed between the upper scroll casing 210 and the lower scroll casing 220a to define a first passageway C1 and a second passageway C2. Therefore, the scroll casing 200a may guide the flow of air, which is formed by the fan 300, into the air conditioning unit 2 by forming two layers of airflow.

Referring to FIG. 10, the lower scroll casing 220a may include a second protruding portion 225 protruding downward from the inner end 222.

The second protruding portion 225 may be coupled to a band part 510a of the bell mouth 500a, thereby improving vibration resistance.

When the vehicle travels, vibration in the axial direction may be generated in the vehicle and higher than vibration in the radial direction depending on a state of a road surface. In this case, to more effectively cope with the vibration in the axial direction, the second protruding portion 225 may support one side of the band part 510a, thereby further improving vibration resistance.

In addition, because the second protruding portion 225 is disposed in a first groove 516 of the band part 510a, it is possible to improve vibration resistance against vibration generated in the radial direction and improve coupling properties and supporting force made by coupling.

Meanwhile, the second protruding portion 225 may be coupled to the band part 510a, thereby guiding the arrangement of the bell mouth 500a.

The fan 300 is rotatably disposed in the scroll casing 200, the inner end 222 of the lower scroll casing 220a, which defines the inlet port 221, may be disposed to be spaced apart from the lower fan 320 in the radial direction, thereby defining a separation space, i.e., a gap.

Therefore, the bell mouth 500a may be disposed to close the separation space, thereby preventing the air from flowing reversely to the outside of the lower scroll casing 220a. In consideration of the rotation of the fan 300, there is difficulty in disposing the bell mouth 500a so that the bell mouth 500a is in contact with the fan 300. However, the shape of the bell mouth 500a capable of guiding the flow of air may prevent the reverse flow.

In this case, the bell mouth 500a may be disposed in the inlet port 221 and guide the inside air toward the center of the lower fan 320.

Referring to FIG. 11, the bell mouth 500a may include the band part 510a having an annular shape, and the legs 520 protruding from a lower portion of the band part 510a and coupled to the motor 420.

The band part 510a may be disposed below the lower fan 320. In this case, an outer end of the band part 510a may be disposed to be in contact with the inner end 222 of the lower scroll casing 220a and disposed to overlap the separation space in the axial direction.

That is, the band part 510a may be disposed on the axial direction of the separation space and serve as a cover that covers a lower side of the separation space.

Therefore, the band part 510a may close the separation space to prevent the air, which flows in the scroll casing 200, from flowing reversely to the outside of the scroll casing 200 through the inlet port 221.

However, in consideration of the arrangement relationship with the rotating fan 300, the band part 510a disposed below the lower fan 320 may be disposed to be spaced apart from the lower fan 320. However, the band part 510a may have the structure for guiding the air into the scroll casing 200, thereby preventing the reverse flow.

As illustrated in FIGS. 11 and 12, the band part 510a may include a body 511 having an annular shape, an inner wheel portion 512 protruding upward from the inner end of the body 511, an outer wheel portion 513 protruding upward from the outer end of the body 511, and a flange portion 515 protruding from the outer wheel portion 513 in the radial direction. In this case, the flange portion 515 may be disposed to be in contact with a lower surface of the inner end 222 of the lower scroll casing 220.

In addition, the band part 510a may further include a hole 514 formed to penetrate the body 511 in the axial direction.

In addition, to drain moisture and couple the second protruding portion 225 of the lower scroll casing 220a, the band part 510a may include the first groove 516 and a second groove 517 formed in the flange portion 515.

The outer wheel portion 513 of the band part 510a may be disposed to be higher than an upper surface of the inner end 222. In this case, an upper side of the outer wheel portion 513 may be disposed to overlap a lower side of the lower fan 320 in the radial direction.

Referring to FIGS. 10 to 12, because the end surface 513b of the outer wheel portion 513 is disposed to be higher than an upper surface 222a of the inner end 222 of the lower scroll casing 220a, the outer wheel portion 513 may guide, upward, the flow of air moved to the inner end 222. Therefore, an outer surface 513c of the outer wheel portion 513 may primarily block a flow of air that may be generated toward the center of the band part 510a of the bell mouth 500a.

Meanwhile, the end surface 512c of the inner wheel portion 512 may be disposed to be higher than the upper surface 222a of the inner end 222 of the lower scroll casing 220a.

The flange portion 515 may be disposed to protrude from the outer wheel portion 513 in the radial direction. Therefore, the flange portion 515 may be provided at the outer end of the band part 510a.

Further, the flange portion 515 may be disposed to be in contact with the lower surface of the inner end 222 of the lower scroll casing 220 and prevent the reverse flow.

The first groove 516 may be concavely formed in the circumferential direction in the flange portion 515. For example, the first groove 516 may be formed along the outer wheel portion 513. Further, the second protruding portion 225 may be disposed in the first groove 516. Therefore, the second protruding portion 225 may be disposed to overlap the flange portion 515 in the axial direction.

The second groove 517 may be connected to the first groove 516 in the radial direction.

Therefore, the second groove 517, together with the first groove 516, may implement a drain channel which is a drain structure of the flange portion 515. For example, when the moisture is collected in the first groove 516, the moisture may be discharged through the second groove 517. Therefore, the first groove 516 and the second groove 517 may improve drainage performance of the blower unit 1a.

Meanwhile, the fan 300 of the blower unit 1a may further include the barrier 330.

While the present invention has been described with reference to exemplary embodiments, it will be understood by those skilled in the art that various changes and modifications may be made without departing from the spirit and scope of the present invention as defined by the appended claims. It will be understood that differences related to the modification and change are included in the scope of the embodiments as defined by the following claims.

The invention claimed is:

1. A blower unit for a vehicle, the blower unit comprising:
a scroll casing having an inlet port;
a fan assembly rotatably disposed in the scroll casing;
a motor having a shaft coupled to the fan assembly; and
a bell mouth disposed in the inlet port,
wherein an inner end of the scroll casing, which defines the inlet port, is disposed to be spaced apart from the fan assembly in a radial direction to define a separation space,
wherein an outer end of the bell mouth is disposed to overlap the inner end of the scroll casing in an axial direction to prevent air, which flows by a rotation of the fan, from flowing reversely to the outside of the scroll casing through the separation space,
wherein the bell mouth comprises a band part having an annular shape, and legs protruding from a lower portion of the band part and coupled to the motor,
wherein the band part comprises a body, an inner wheel portion protruding upward from an inner end of the body, and an outer wheel portion protruding upward from an outer end of the body,
wherein the scroll casing further comprises a first protruding portion protruding upward from the inner end of the scroll casing and a guide protruding downward from the inner end of the scroll casing,
wherein the end surface of the outer wheel portion, which is in contact with a lower surface of the inner end of the scroll casing, overlaps with the first protruding portion in the axial direction to guide the flow of air moving toward the inner end upward, and
wherein the guide supports one side of the outer wheel portion.

2. The blower unit of claim 1, wherein the band part comprises a hole that penetrates the body in the axial direction.

3. The blower unit of claim 1, wherein the fan assembly comprises:
an upper fan; and
a lower fan disposed below the upper fan,
wherein the scroll casing comprises:
an upper scroll casing;
a lower scroll casing; and
a separation wall disposed between the upper scroll casing and the lower scroll casing to define a first passageway and a second passageway, and
wherein a flow of air formed by a rotation of the upper fan moves through the first passageway, and a flow of air formed by a rotation of the lower fan moves through the second passageway.

4. The blower unit of claim 1, wherein a lower scroll casing of the fan assembly further comprises a barrier disposed between the inner wheel portion and the outer wheel portion.

5. An air conditioning device comprising:
a blower unit; and
an air conditioning unit configured to cool or heat air delivered by the blower unit,
wherein the blower unit comprises:
a housing;
a scroll casing disposed in the housing and having an inlet port;
a fan rotatably disposed in the scroll casing;
a motor having a shaft coupled to the fan; and
a bell mouth disposed in the inlet port,
wherein an inner end of the scroll casing, which defines the inlet port, is disposed to be spaced apart from the fan in a radial direction to define a separation space,
wherein an outer end of the bell mouth is disposed to overlap the inner end of the scroll casing in an axial direction to prevent air, which flows by a rotation of the fan, from flowing reversely to the outside of the scroll casing through the separation space,
wherein the bell mouth comprises a band part having an annular shape, and legs protruding from a lower portion of the band part and coupled to the motor,
wherein the band part comprises a body, an inner wheel portion protruding upward from an inner end of the body, and an outer wheel portion protruding upward from an outer end of the body,
wherein the scroll casing further comprises a first protruding portion protruding upward from the inner end of the scroll casing and a guide protruding downward from the inner end of the scroll casing,
wherein the end surface of the outer wheel portion, which is in contact with a lower surface of the inner end of the scroll casing, overlaps with the first protruding portion in the axial direction to guide the flow of air moving toward the inner end upward, and
wherein the guide supports one side of the outer wheel portion.

* * * * *